April 15, 1969   H. J. SCHWERDHÖFER   3,438,283
MULTIPLE SPEED HUB FOR A BICYCLE AND LIKE VEHICLE
Filed Jan. 31, 1967

INVENTOR
Hans Joachim Schwerdhöfer
BY
Row and Berman
Agents

April 15, 1969     H. J. SCHWERDHÖFER     3,438,283

MULTIPLE SPEED HUB FOR A BICYCLE AND LIKE VEHICLE

Filed Jan. 31, 1967     Sheet 5 of 6

INVENTOR

Hans Joachim Schwerdhöfer
BY Low and Berman
          Agents

3,438,283
MULTIPLE SPEED HUB FOR A BICYCLE AND LIKE VEHICLE

Hans Joachim Schwerdhofer, Schweinfurt, Germany, assignor to General Dynamics Corporation (Pomona Division), Pomona, Calif., a corporation of Delaware
Filed Jan. 31, 1967, Ser. No. 612,916
Claims priority, application Germany, Feb. 2, 1966, F 48,325
Int. Cl. F16h 57/10, 5/04
U.S. Cl. 74—750                            21 Claims

ABSTRACT OF THE DISCLOSURE

A four-speed hub having two planetary gear transmissions arranged in tandem, the input member of the first transmission being rotated by a sprocket, and two unidirectional clutches being interposed between the hub shell and respectively the input or output member of the first transmission and the output member of the second transmission. The speed ratio of the input and output members of the first transmission may be changed by a manually operated mechanism including a control member axially movable in a bore of the hub shaft. Engagement of the clutch associated with the second transmission is controlled by a back-pedaling mechanism or by a centrifugal governor driven by the hub shell.

Background of the invention

This invention relates to multiple speed hubs for bicycles and similar vehicles, and particularly to hubs having more than three speed ratios between a sprocket or driver and the hub shell.

Four-speed hubs known heretofore, for example, from the German Patent 1,062,133, are controlled by a tension member, such as a Bowden cable, which is attached to two connected rods of different diameter axially movable in a bore which extends over the entire length of the stationary hub shaft. The two rods are respectively connected to a coupling member and to an axially movable sun gear of a planetary gear transmission which provides the four speeds.

The shaft is weakened by the long bore whose diameter must be adequate for accommodating return springs associated with the rods. It was therefore necessary to provide such four-speed hubs with shafts of relatively great diameter and with correspondingly bulky hub shells.

When a hub has only two speed positions, it is readily controlled by a tension member in the manner outlined above, and the end points of the speed changing movements of the apparatus can be set permanently by means of abutments. When a single tension member is to provide four positions of a speed changing mechanism, the two intermediate positions of the mechanism can be defined only by a relatively complex shifting device and readjustment is required when the Bowden cable slackens.

It would not be adequate to provide two separate speed control systems actuated by separate cables and associated hand operated levers, each system having only two, readily defined end positions. The two levers would invite confusion and would make operation of a bicycle rather difficult even though such a system would overcome some of the difficulties of the known devices.

Summary of the invention

The invention more specifically relates to a multiple-speed hub of the type in which the torque of a driving member rotatable about the hub axis may be transmitted to the shell of the hub at any of four transmission ratios, the transmission arrangement including two planetary gear transmissions arranged in tandem and each including a plurality of members which respectively constitute a sun gear, a ring gear, and a planet carrier. A planet gear is mounted on the planet carrier in simultaneous meshing engagement with the sun gear and the ring gear. Coupling devices or clutches are provided for drivingly coupling one of the transmission members to the hub shell. A control system is operatively connected to each transmission for selecting the transmission ratios of the hub, and an actuating system operates the control system.

The invention resides mainly in improvements of the actuating system and of its cooperation with the control system.

The actuating system of the invention provides separate actuating means for the two planetary gear transmissions. The actuating means each include an actuating member. The first actuating means include a first actuating member received in an axial bore of the hub shaft, and manually operated means for axially moving the actuating member in the bore. Motion transmitting means in the control system connect the actuating member to one of the planetary gear transmissions.

The other planetary gear transmission is similarly connected to a second actuating member of the second actuating means which are operatively connected to the hub shell or to the driving member for movement of the second actuating member in response to the rotation of the shell or of the driving member.

Description of the preferred embodiments

Figure 1:
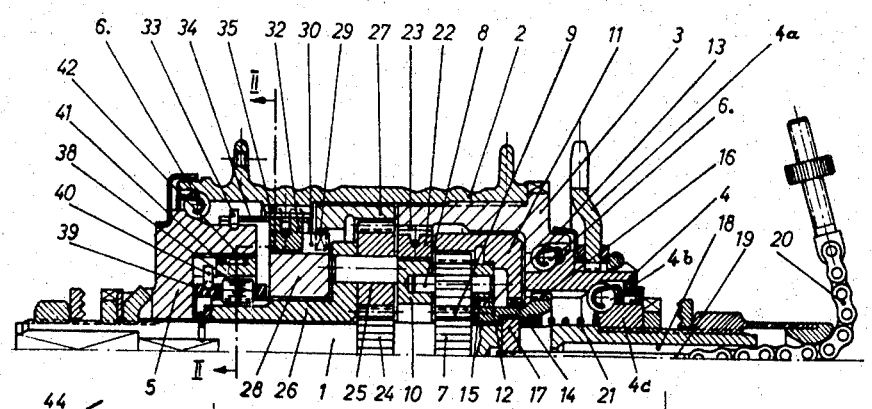
FIG. 1 shows one half of a four-speed hub of the invention in axial section.

Referring now to the drawing in detail, and initially to FIG. 1, there is seen a four-speed hub of the invention in axial section, only one-half of the hub being illustrated, as is conventional. The stationary shaft 1 of the hub supports two planetary gear transmissions, which are enclosed within a hub shell 2, and are arranged in tandem.

The shell 2 is provided at one internal axial end with a fixed tubular bearing member 3 which is supported by means of bearing balls 6 on a tubular driver 4, whereas the other end of the shell 2 is rotatably mounted by means of balls 6 on a bearing member 5 fixedly secured on the shaft 1.

The driver 4 is fast on a sprocket 4a which normally receives driving torque from a chain. Bearing balls 4b are interposed between the driver 4 and a fixed bearing member 4c on the shaft 1. The driver 4 is coupled by a sleeve 12 to a first dual-speed planetary gear transmission which includes a sun gear 7 fixedly fastened on the shaft 1, a ring gear 11 rotatably mounted on the bearing member 3, and planet gears 9 interposed between the sun gear 7 and the ring gear 11 in simultaneous meshing engagement. The planet gears 9 are mounted on a planet carrier 10 by means of pins 8.

The coupling sleeve 12 is axially movable within the shell 2 and is secured to the driver 4 for joint rotation in all its axial positions by engaged radial teeth or splines 15, 16. It transmits motion of the driver 4 either to the planet carrier 10 or to the ring gear 11 by engagement of teeth 15 on the coupling sleeve 12 with teeth 13, 14 on the planet carrier and the ring gear respectively.

A slide 17 is axially guided in a slot of the shaft 1 and is urged to move toward the left, as viewed in FIG. 1, by a return spring 21. It can be moved toward the right by an attached pullrod 19 in a blind axial bore 18 of the shaft 1, and by a chain 20 attached to the pullrod. The slide 17 engages the coupling sleeve 12 to transmit motion from the pullrod 19 to the first planetary gear transmission. In the illustrated position, the spring 21 holds the coupling sleeve 12 in driving engagement with the planet carrier 10.

The planet carrier 10 carries pawls 22 which are urged into engagement with a ratchet 23 on the inner face of the bearing member 3 by a pawl spring. The unidirectional pawl-and-ratchet clutch elements 22, 23 are conventional in themselves and closely similar to corresponding elements of a second unidirectional clutch or coupling shown in more detail in FIGS. 2 and 3.

The planet carrier 10 is secured to the planet carrier 26 of a second planet gear transmission for joint rotation by means of the pins on which the planet gears 25 of the second transmission are mounted. The gears 25 simultaneously mesh with a sun gear 24 fast on the shaft 1 and with an internally toothed ring gear 27. The unidirectional clutch associated with the second planetary gear transmission includes a pawl carrier 28 which is coupled to the ring gear 27 for joint rotation by radially projecting abutments 29, 30. Two pawls 32 are partly received in respective pockets 31 of the pawl carrier 28 and are biased by a pawl spring into engagement with a ratchet 35 on the inner wall of the hub shell 2.

Engagement between the pawls 32 and the ratchet 35 is controlled by a partly cylindrical sleeve 34 whose rotation about the hub axis is impeded by a spring 33 attached to the sleeve 34 and frictionally engaging the stationary bearing member 5. The cylindrical portion of the control sleeve 34 has two openings 36 which are radially aligned with the pawls 32 in the position of the apparatus illustrated in FIG. 2, and angularly offset from the pawls in the position shown in FIG. 3. Internal projections 37 on the sleeve 34 abuttingly engage the pawls 32 in the position of the clutch shown in FIG. 3, and are remote from the pawls in the position of FIG. 2.

A roller clutch equipped with an overload release device is interposed between the stationary bearing member 5 and the planet carrier 26. It includes a friction roller 38 held in a cage 39 between a ring 41 and a guide face 43 of the planet carrier 26 which slopes helically away from the hub axis in a circumferential direction. The ring 41 is normally held in coaxial alignment within a cylindrical bore of the bearing member 5 by a centering spring 42 of open annular shape which frictionally couples the ring 41 to the bearing member 5. A spring 40 on the ring 41 frictionally engages the cage 39.

Figures 2, 3:
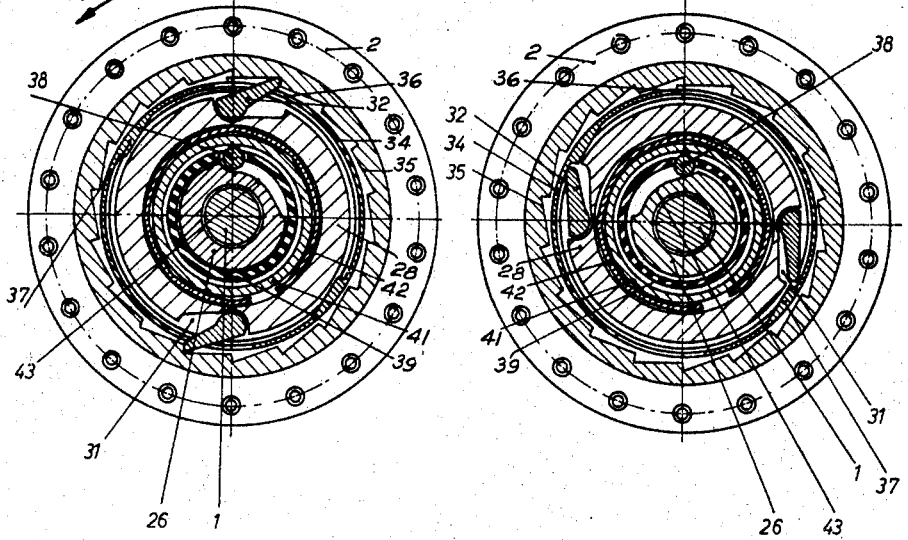
FIG. 2 shows the hub of FIG. 1 in radial section on the line II—II.
FIG. 3 illustrates the device of FIG. 2 in a different operating condition.

The afore-described multiple-speed hub operates as follows:

In the position of the coupling sleeve 12 shown in FIG. 1, and the position of the control sleeve 34 illustrated in FIG. 2, power is transmitted from the sprocket 4a and the driver 4 by the sleeve 12 to the planet carriers 10 and 26, and the ring gear 27 is rotated by the planet gears 25 at a speed higher than that of the planet carriers. The hub shell 2 is driven by the unidirectional clutch constituted by the pawls 32 and the ratchet 35 whereas the pawls 22 on the planet carrier 10 are overtraveled by the more quickly rotating ratchet 23 (high speed).

If the individual transmission ratios of the two planetary gear transmissions are $i_1$ and $i_2$ respectively, $i_1$ and $i_2$ both being greater than 1, the overall transmission ratio $r$ of the hub in the high-speed position is $r=i_2$.

If the sprocket 4a is rotated backward by back-pedaling, the pawl carrier 28 rotates in the direction of the arrow 44 in FIG. 2 while the control sleeve 34 is held stationary by the spring 33, whereby the pawls 32 are withdrawn from the openings 36, pass over the projections 37, and reach the position shown in FIG. 3 in which they prevent relative angular displacement of the pawl carrier 28 and of the sleeve 34 when forward pedaling is resumed. The pawls 32 are held out of engagement with the ratchet 35 by the sleeve 34.

During the backward rotation of the planet carrier 26, the roller 38 is moved radially outward along the guide face 43 until it clampingly holds the planet carrier 26 to the ring 41, whereby free back pedaling is limited to an angle only slightly greater than that necessary for shifting the control sleeve 34 and the pawls 32 from the relative position of FIG. 2 into that of FIG. 3. The roller clutch is released during forward pedaling, and subsequent back-pedaling returns the pawls 32 to alignment with the openings 26 as shown in FIG. 2.

When the pawls 32 are withdrawn into the sleeve 34, as shown in FIG. 3, the hub shell 2 is rotated by the unidirectional clutch 22, 23 at the rotary speed of the planet carriers 10, 26. In the position of the slide 17 shown in FIG. 1, this speed is identical with that of the sprocket 4a (direct speed $r=1$).

When the chain 20 is pulled by means of a non-illustrated Bowden cable and a shifting lever on the frame or on the handle bars of the bicycle with which the hub is normally assembled, the coupling sleeve 12 is moved toward the right, as viewed in FIG. 1, until the ring gear 11 is coupled with the driver 4. The planet carriers 10, 26 are rotated at a speed which is lower than that of the sprocket 4a, and this speed is transmitted to the hub shell 2 by the pawls 22 if the pawls 32 are retracted as shown in FIG. 3 (low speed, $r=1/i_1$). If the pawls 32 can engage the ratchet 35 in the position illustrated in FIG. 2, the speed of the hub shell is greater than that of the planet carriers 10, 26, and the rotary speed of the hub shell is determined by the transmission ratios of both planetary gear transmissions. These ratios are preferably selected different so that the fourth speed of the hub is either intermediate the high and direct speeds or intermediate the low and direct speeds ($a=i_2/i_1$).

If the hub is in its low-speed position, and it is desired to shift to the high-speed position, the coupling sleeve 12 is manually shifted from the non-illustrated position of engagement with the ring gear 11 into the illustrated position by releasing the chain 20, and the pawls 32 are simultaneously released from the position of FIG. 3 into that of FIG. 2 by back-pedaling.

FIGS. 4 to 27 illustrate variants of the four-speed hub of FIGS. 1 to 3 in which the hub-elements are represented by conventional symbols. In each of these figures, there are shown a driver 45, the planet carrier 46 and ring gear 47 of a first planetary gear transmission, the planet carrier 48 of a second planetary gear transmission, a unidirectional clutch 49 associated with the first transmission, a unidirectional clutch 50 associated with the second transmission, and a speed changing mechanism 51 for the second transmission responsive to back-pedaling. Unless stated specifically otherwise, these elements may be identical with corresponding elements shown in FIGS. 1 to 3, and it will be understood that the devices of FIGS. 4 to 27 include sun gears and other necessary elements obvious from the preceding description of FIGS. 1 to 3.

Figure 4:
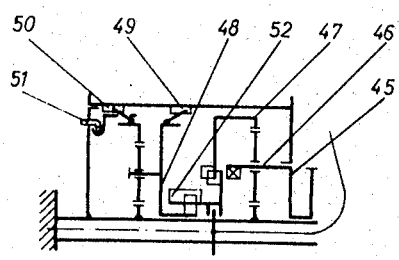
FIGS. 4 and 5, 6 and 7, 8 and 9, 10 and 11, 12 and 13, 14 and 15, 16 and 17, 18 and 19, 20 and 21, 22 and 23, 24 and 25, 26 and 27 diagrammatically illustrate twelve modifications of the hub of FIGS. 1 to 3, each modification being shown in two different operating positions, the view corresponding to that of FIG. 1.
Figure 5:
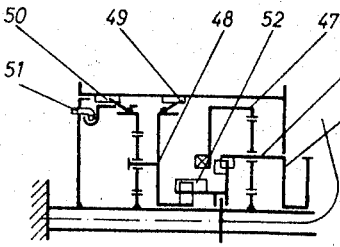

In the modified four-speed hub shown in FIGS. 4 and 5, an axially movable coupling sleeve 52 is interposed between the two planetary gear transmissions in such a manner that it may connect the planet carrier 48 of the second transmission either with the ring gear 47 or with the planet carrier 46 of the first transmission. The driver 45 is fixedly connected with the first planet carrier 46, and the clutches 49, 50 are respectively interposed between the planet carrier and the ring gear of the second transmission and the hub shell. The unidirectional clutch 50 is controlled by the mechanism 51 in response to back pedaling.

In the position of the coupling sleeve 52 illustrated in FIG. 4, the first planetary gear transmission is set for its higher output speed while the output speed of the first transmission is equal to its input speed in the position of FIG. 5 in which the sleeve 52 engages the planet carrier 46.

Figure 6:
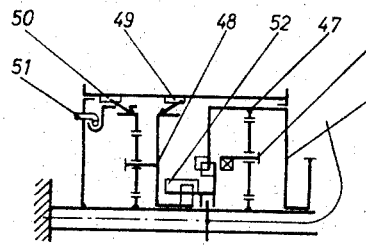
Figure 7:
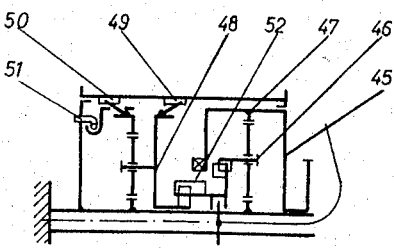

The four-speed hub shown in FIGS. 6 and 7 differs from that described above with reference to FIGS. 4 and 5 by a fixed connection of the driver 45 with the first ring gear 47. The second planet carrier 48 is therefore driven at the input speed of the hub when the sleeve 52 engages the ring gear 47, as is shown in FIG. 6. When the sleeve 52 engages the first planet carrier 46 (FIG. 7), the output speed of the first transmission is lower than its input speed. It will be understood that the transmission ratio of the second planetary gear transmission may be changed by the back-pedaling mechanism 51 in the manner described in more detail with reference to FIGS. 1 to 3, whereby a total of four speeds becomes available.

Figure 8:
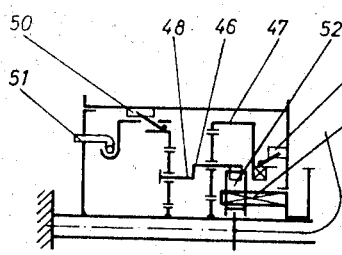
Figure 9:
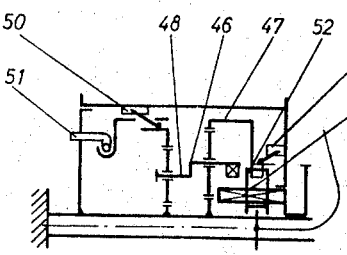

In the four-speed hub of FIGS. 8 and 9, the unidirectional clutch 49 of the first planetary gear transmission has an input portion such as pawls mounted on the first ring gear 47, the arrangement being otherwise identical with that shown in FIGS. 1 to 3. In the axial position of the coupling sleeve 52 shown in FIG. 8, the two connected planet carriers 46, 48 therefore rotate at the input speed of the driver 45, and the input portions of the clutches 49, 50 rotate at higher speeds. If the clutch 50 is engaged, motion is transmitted from the driver 45 to the hub shell by the clutch associated with the planetary gear transmission having the higher individual transmission ratio.

When the coupling sleeve 52 connects the driver 45 with the ring gear 47, as shown in FIG. 9, the hub shell is driven at the speed of the driver 45 by the clutch 49 if the clutch 50 is disengaged by the mechanism 51. If the individual transmission ratio of the second planetary gear transmission is higher than that of the first one, the hub shell is driven at an intermediate speed higher than the input speed by the clutch 50 when the latter is engaged in the position of the coupling sleeve 52 shown in FIG. 9.

Figure 10:
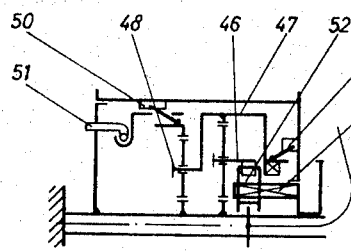
Figure 11:
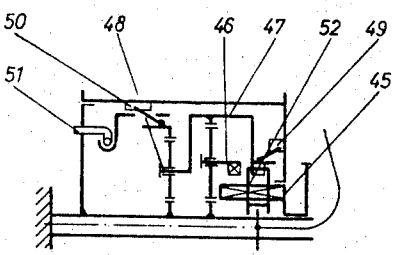

The modified four-speed hub shown in FIGS. 10 and 11 has a second planet carrier 48 fixedly connected to the ring gear 47 of the first planetary gear transmission, the arrangement being otherwise as in FIGS. 8 and 9. Depending on the condition of engagement of the second unidirectional clutch 50, the transmission ratio $r$ of the hub is $i_1 \times i_2$ or $i_1$ in the position of the coupling sleeve 52 illustrated in FIG. 10. The two output speeds available in the sleeve position of FIG. 11 are either equal to the input speed or greater by the factor $i_2$.

Figure 12:
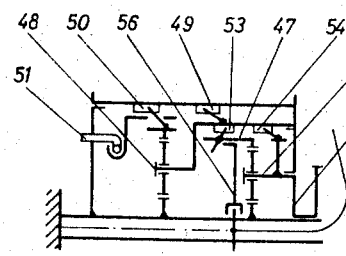
Figure 13:
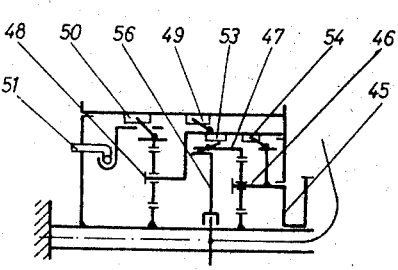

FIGS. 12 and 13 show a four-speed hub which is similar in its operation to that described above with reference to FIGS. 4 and 5, but is provided with two additional unidirectional clutches 53, 54 for connecting the ring gear 47 or the first planet carrier 46 with the second planet carrier 48, the clutches being of the type shown in FIGS. 2 and 3.

The clutch 53 interposed between the first ring gear 47 and the second planet carrier 48 is equipped with a flanged control disc 56 which may be shifted in an axial direction in the same manner as the aforedescribed coupling sleeve 12, and tilts the pawls of the clutch 53 against the restraint of their pawl spring away from the cooperating ratchet on the planet carrier 48 in a manner well known in this art. In the position of the control disc 56 shown in FIG. 12, motion is transmitted from the driver 45 to the second planet carrier 48 at the higher speed of the first ring gear 47 while the ratchet overtravels the pawls in the unidirectional clutch 54. When the clutch 53 is disengaged by the disc 56, as shown in FIG. 13, the planet carrier 48 is rotated at the hub input speed by the clutch 54.

Figure 14:
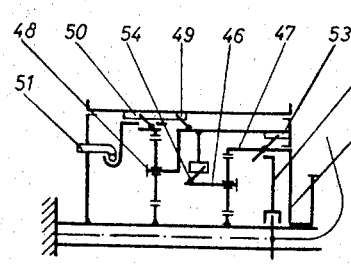
Figure 15:
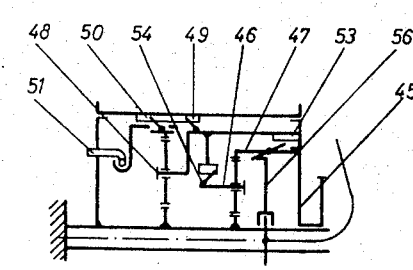

The hub illustrated in FIGS. 14 and 15 differs structurally from that described with reference to FIGS. 12, 13 in having a first ring gear 47 fixedly connected with the driver 45, and a unidirectional clutch 49 interposed between the two planet carriers 46, 48. The four overall transmission ratios of the hub available in this arrangement are $i_2$, 1, $i_2/i_1$, and $1/i_1$.

Figure 16:
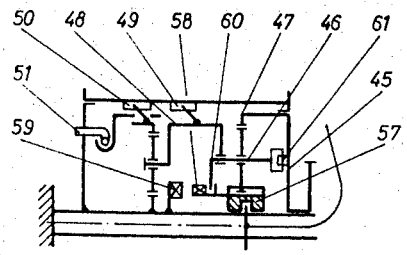
Figure 17:
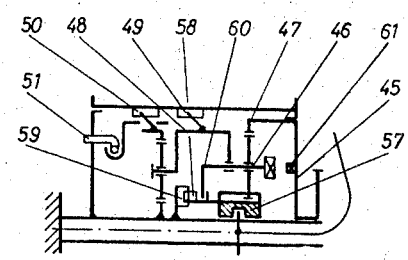

The hub shown in FIGS. 16 and 17 has a first planet carrier 46 which is connected with the second planet carrier 48 for joint rotation, but which may be moved axially by the manual shifting mechanism jointly with the first sun gear 57, a coupling 60 rotatably connecting the first planet carrier to the first sun gear for joint axial movement. In the axial position of the planet carrier 46 and sun gear 57 shown in FIG. 16, the sun gear rotates freely on the hub shaft, and the planet carrier 46 engages the first ring gear 47 by means of a jaw clutch 61 so that the first planetary transmission is rotated as a unit by the driver 45 which is attached to the ring gear 47.

In the axial position of the sun gear 57 and of the planet carrier 46 shown in FIG. 17, the sun gear 57 is locked to the stationary shaft of the hub by cooperating abutments 58, 59, and the jaw clutch 61 is disengaged. The unidirectional clutch 49 is mounted on the second planet carrier 48. The four overall speed ratios available with the hub of FIGS. 16, 17 are $i_2$, $i_2/i_1$, 1 and $1/i_1$, as will be obvious from the preceding description.

Figure 18:
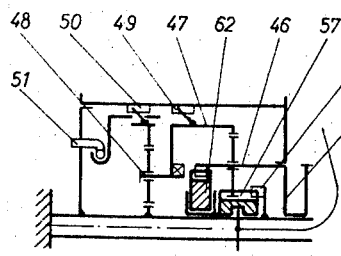
Figure 19:
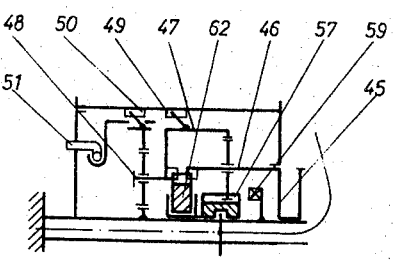

The hub shown in FIGS. 18 and 19 has a driver 45 which is fastened to the first planet carrier 46, and a first ring gear 47 which is fastened to the second planet carrier 48. An annular coupling member 62 is connected to the sun gear 57 of the first planetary gear transmission for joint axial movement toward and away from the position of FIG. 19 in which the member 62 couples the planet carriers 46, 48.

An abutment 59 locks the sun gear 57 to the hub shaft in the position of FIG. 18 while the sun gear 57 rotates freely on the shaft in the position of FIG. 19 in which the first planetary gear transmission thus rotates as a unit with the driver 45 and the second planet carrier 48. In the position of the apparatus shown in FIG. 18, the second planetary gear transmission is driven at the speed of the ring gear 47 which carries the first unidirectional clutch 49.

The four overall transmission ratios of the hub shown in FIGS. 18, 19 are $i_1$, $i_1 \times i_2$, $i_2$, and 1, the second unidirectional clutch 50 being controlled by the back-pedaling mechanism 51 in the manner described above to provide two speeds in each of the two illustrated positions of the sun gear 57 and of associated elements.

Figure 20:
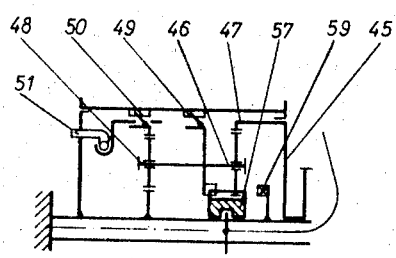
Figure 21:
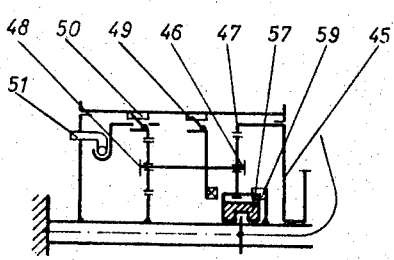

In the hub illustrated in FIGS. 20 and 21, the two planet carriers 46, 48 are permanently coupled, and the first ring gear 47 is attached to the driver 45. The sun gear 57 is locked to the planet carriers and is freely rotatable on the hub shaft in the position of FIG. 20, while it releases the planet carriers and is locked to the shaft by the abutment 59 when axially shifted into the position of FIG. 21.

The ratios between the output and input speeds of the hub of FIGS. 20 and 21 are $i_2$, 1 $1/i_1$, and $i_2/i_1$.

Figure 22:
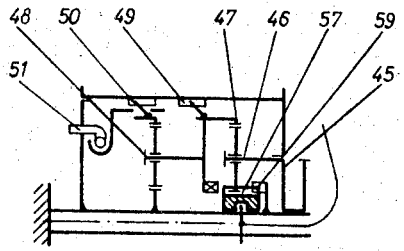
Figure 23:
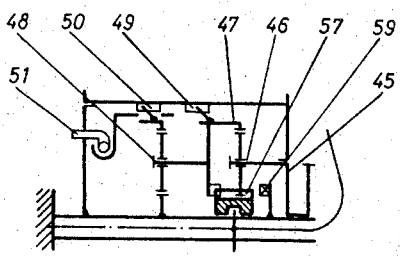

The modified hub seen in FIGS. 22 and 23 differs from that illustrated in FIGS. 20, 21 by a driver 45 which is attached to the first planet carrier 46, whereas the second planet carrier 48 is fixedly connected to the first ring gear 47, the sun gear 57 being locked to the latter in the position of FIG. 23 in which the first planetary gear transmission of the hub rotates as a unit.

The speed ratios resulting from manual axial shifting of the sun gear 57 and from engagement or disengagement of the clutch 50 by back pedaling are $i_1 \times i_2$, $i_1$, $i_2$, and 1.

Figure 24:
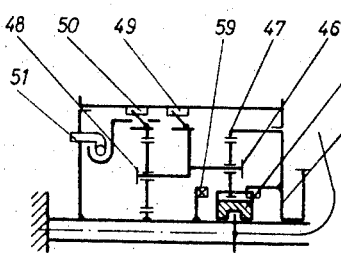
Figure 25:
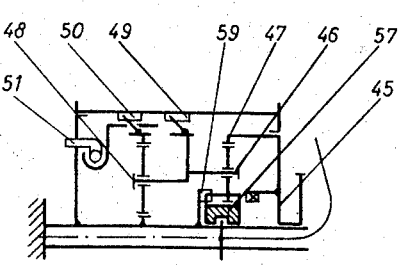

The hub shown in FIGS. 24, 25 is similar to that described above with reference to FIGS. 20, 21 in that the driver 45 is fast with the ring gear 47, the planet carriers 46, 48 are coupled, and the first unidirectional clutch 49 is mounted on the planet carrier 48. The sun gear 57 may be shifted between the position of FIG. 24 in which it is locked to the ring gear 47 and that of FIG. 25 in which it is locked to the shaft by an abutment 59. The four speed ratios available in this device are $i_2$, 1, $i_2/i_1$ and $1/i_1$.

Figure 26:
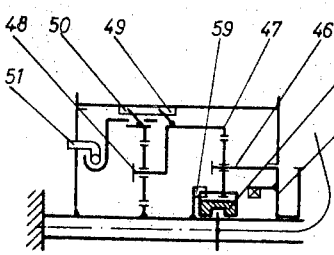
Figure 27:
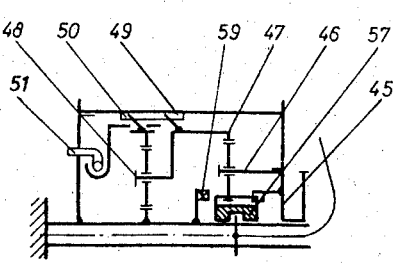

FIGS. 26, 27 show two manually settable positions of a four-speed hub in which the second planet carrier 48 is fastened to the first ring gear 47 and the driver 45 is fastened to the first planet carrier 46. In the axial position of FIG. 26, the sun gear 57 is secured against rotation by an abutment 59 on the stationary shaft of the hub, and in the position of FIG. 27 it is freely rotatable on the shaft while locked to the driver 45 and the planet carrier 46.

Depending on the condition of the clutch 50, the speed ratios of the apparatus, as shown in FIG. 26, are $i_1 \times i_2$ or $i_1$. In the position of FIG. 27, the available speed ratios are $i_2$ or 1.

It has been assumed in the preceding description of FIGS. 4 to 27 that the speed changing mechanism 51 of the second planetary gear transmission, not shown in detail in these figures, responds to back pedaling in the manner more fully described with reference to FIGS. 1 to 3 to engage or disengage the clutch 50. It will be understood that the speed changing mechanism 51 of the second planetary gear transmission in each of the illustrated and described variants may also be of the type shown in FIG. 28 in a view corresponding to that of FIG. 1.

Figure 28:
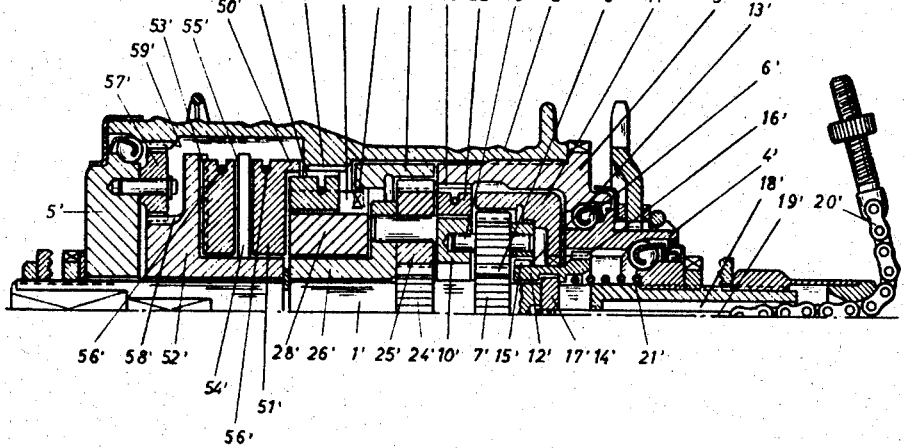
FIG. 28 illustrates yet another four-speed hub of the invention in a view corresponding to that of FIG. 1.

The four-speed hubs shown in FIGS. 1 and 28 have many elements in common. Reference numerals 1' to 30', 32', and 35' in FIG. 28 indicate elements which are either identical with elements 1 to 30, 32 and 35 in FIG. 1, or so closely similar as not to require separate description. The similar or identical elements thus include the entire first planetary gear transmission with its drive and speed shifting devices, and the gearing and unidirectional clutch of the second planetary gearing transmission. The two hubs differ in the mechanisms which control the transmission ratio of the respective second planetary gear transmissions.

A flanged, tubular carrier 52' rotates freely on the shaft 1' between the stationary bearing member 5' and the planet carrier 26'. A small gear wheel 57' rotatably mounted on the bearing member 5' simultaneously meshes with an external gear rim 58' on the carrier 52' and an internal gear rim 59' on the hub shell 2', the pitch diameter of the coaxial gear rims 59', 58' being such that the rotary speed of the carrier 52' is approximately twice that of the hub shell 2'.

Four centrifugal weights 51' of which only one is seen in FIG. 28, are secured axially and circumferentially on the carrier 52' by radial pins 54' fastened to the carrier and slidably received in corresponding bores 55' of the weights 51' and by engaged radial ribs and grooves 53' on the flange portion of the carrier 52' and on each weight 51'. Wire springs 56' having each the shape of an open ring normally hold the weights 51' near the axis of rotation of the hub, as shown in FIG. 28.

Axially projecting flanges 50' on the weights 51' engage the pawls 32' in the illustrated position of the apparatus, and hold the pawls out of engagement with the ratchet 35' under the force of the springs 56' which is sufficient to overcome that of the relatively weak pawl spring. When the hub 2' rotates during normal travel of the vehicle of which the illustrated hub normally is an element, centrifugal forces are exerted on the weights 51' and overcome the restraint of the spring 56' when a sufficient speed is reached. The pawls 32' are then released by the flanges 50' to engage the ratchet 35'.

In the illustrated position of the apparatus, motive power is transmitted from the driver 4' to the coupling sleeve 12', the planet carrier 10', the unidirectional clutch 22', 23', and to the hub shell 2' which is turned at the speed of the driver 4'. The pawls 32' rotate idly at the higher speed of the ring gear 27 in the second planetary gear transmission. When the weights 51' release the pawls 32', the pawls drivingly engage the ratchet 35', and the hub shell 2' overtravels the slower moving pawls 22'.

If the individual transmission ratios of the two planetary gear transmissions are $i_1$ and $i_2$, the weights 51' change the ratio of the output and input speeds of the hub between values of 1 and $i_2$ as long as the coupling sleeve 12' assumes the illustrated position. When the sleeve 12' is shifted toward the right, as viewed in FIG. 28, by the chain 20', the centrifugal weights automatically set an overall transmission ratio of $1/i_1$ or $i_2/i_1$ in response to the rotary speed of the hub shell 2'.

Figure 29:
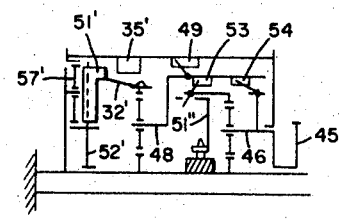
FIG. 29 shows a modification of the device of FIG. 28 in the manner of FIG. 12.

As seen in FIG. 29, the centrifugal governor arrangement shown in FIG. 28 may be combined with the back-pedaling mechanism of FIGS. 1 to 3 for respectively controlling two planetary gear transmissions arranged in tandem within a common hub shell. The planet carrier 46 and the asociated ring gear in one planetary gear transmission are connected to the planet carrier 48 of the other transmission by means of two unidirectional pawl-and-ratchet clutches 53, 54. The planet carrier 46 is driven and the ring gear therefore rotates faster than the planet carrier. The unidirectional clutch 53 mounted on the ring gear may be disengaged by a back-pedaling arrangement 51" closely similar to that shown in FIGS. 1 to 3 and mainly consisting of a control sleeve connected to the shaft 1 by a friction spring to shift the sleeve when the pedaling direction is reversed.

The second planetary gear transmission is connected with the hub shell by unidirectional clutches 49 and 32', 35' on its input and output members, the output clutch being controlled by a centrifugal governor 51', 52', 57', as shown in FIG. 28.

What is claimed is:
1. In a multiple-speed hub for a bicycle and like vehicle having:
 (a) a stationary shaft (1) having an axis;
 (b) a hub shell member (2) rotatable about said axis and receiving a portion of said shaft;
 (c) a source of torque including a driving member (4a) rotatable about said axis;
 (d) transmission means in said shell for transmitting the torque of said source to said shell at any one of a plurality of transmission ratios,
  (1) said transmission means including two planetary gear transmissions arranged in tandem,
  (2) each transmission including a plurality of members respectively constituting a sun gear (7, 24), a ring gear (11, 27) and a planet carrier (10, 26); a planet gear (9, 25) mounted on said planet carrier in simultaneous meshing engagement with said sun gear and said ring gear, and coupling means (22, 23; 32, 35) for drivingly coupling one of said members of the transmission to said hub shell member;
 (e) a control system operatively connected to each of said transmissions for selecting said transmission ratios; and
 (f) an actuating system for actuating said control system; the improvement in the actuating system comprising:
 (g) first actuatnig means including
  (1) a first actuating member (19), said shaft being formed with an axial bore (18) receiving said actuating member, and
  (2) manually operated means (20) for axially moving said actuating member in said bore,
  (3) said control system including first motion transmitting means (17) for transmitting motion from said actuating member to one of said transmissions; and
 (h) second actuating means including
  (1) a second actuating member (34, 51'), said second actuating means being operatively connected to one of said rotatable members (2, 4a) and responsive to the rotation of the connected member for movement of said second actuating member, (2) said control system including second motion transmitting means (36, 37; 50′) interposed between said second actuating member and the other one of said transmissions.

2. In a hub as set forth in claim 1, said second actuating means being operatively connected to said driving member and responsive to the direction of rotation of the same for said movement of said second actuating member.

3. In a hub as set forth in claim 1, said second actuating means being operatively connected to said hub shell member, and being responsive to the speed of rotation of said hub shell member for said movement of said second actuating member.

4. In a hub as set forth in claim 1, the members of each planetary gear transmission including a rotatable input member and a rotatable output member, the input member of a first one of said transmissions being secured to said driving member, the output member of said first transmission being operatively connected to the input member of the second transmission, said control system further including speed control means operatively connected to one of said actuating members by the associated motion transmitting means for varying the speed ratio of the input and output members of said first transmission, the coupling means of said second transmission including an engageable clutch interposed between the output member of the second transmission and said hub shell, and the other one of said motion transmitting means of the control system including means for engaging and disengaging said clutch.

5. In a hub as set forth in claim 4, the coupling means of said first transmission including a unidirectional clutch (22, 23), and the output member of said second transmission being the ring gear thereof.

6. In a hub as set forth in claim 5, said input member (4) of said first transmission being drivingly connected to said driving member (4a), and said speed control means including a coupling member (12) connected to said input member for joint rotation and movable between respective positions of driving engagement with the planet carrier (10) and the ring gear (11) of said first transmission (FIGS. 1–3).

7. In a hub as set forth in claim 5, the planet carrier (46) of said transmission constituting the input member thereof, the output member of said first transmission being integral with the planet carrier (48) constituting the input member of said second transmission, said speed control means including a coupling member (52) connected to said input member of the second transmission for joint rotation and movable between respective positions of driving engagement with the planet carrier (46) and the ring gear (47) of the first transmission (FIGS. 4, 5).

8. In a hub as set forth in claim 5, the ring gear (47) of said first transmission constituting the input member thereof, the output member of said first transmission being integral with the planet carrier (48) constituting the input member of said second transmission, said speed control means including a coupling member (52) connected to said input member of the second transmission for joint rotation and movable between respective positions of driving engagement with the planet carrier (46) and the ring gear (47) of the first transmission (FIGS. 6, 7).

9. In a hub as set forth in claim 5, said speed control means including a coupling member (52) connected to said input member (45) of said first transmission for joint rotation and movable between respective positions of driving engagement with the planet carrier (46) and the ring gear (47) of said first transmission, said unidirectional clutch (49) being mounted on said ring gear of the first transmission (FIGS. 8, 9).

10. In a hub as set forth in claim 5, said speed control means including a coupling member (52) connected to said input member (45) of said first transmission for joint rotation and movable between respective positions of driving engagement with the planet carrier (46) and the ring gear (47) of said first transmission, said unidirectional clutch (49) being mounted on said ring gear (47), the ring gear constituting said output member of the first transmission (FIGS. 10, 11).

11. In a hub a set forth in claim 5, the planet carrier (46) of said first transmission constituting the input member thereof, said speed control means including a unidirectional clutch (54) interposed between the planet carriers (46, 48) of said transmissions and an engageable clutch (53) interposed between the planet carrier (48) of said second transmission and the ring gear (47) of the first transmission and connected to the actuating system for operation thereby, the unidirectional clutch (49) of said first transmission being mounted on the planet carrier (48) of the second transmission (FIGS. 12, 13).

12. In a hub as set forth in claim 5, the ring gear (47) of said first transmission constituting the input member thereof, said speed control means including a unidirectional clutch (54) between the planet carrier (46, 48) of said transmission and an engageable clutch (53) interposed between the planet carrier (48) of said second transmission and the ring gear (47) of the first transmission and connected to said actuating system for operation thereby, the unidirectional clutch (49) of said first transmission being mounted on the planet carrier (48) of the second transmission (FIGS. 14, 15).

13. In a hub as set forth in claim 5, the ring gear (47) of said first transmission constituting the input member thereof, the sun gear (57) of said transmission being axially movable on said shaft toward and away from a position of locking engagement with the shaft, said speed control means including means (60) for axially moving said sun gear and for simultaneously moving the planet carrier (46) and the ring gear (47) of said first transmission toward and away from a position of locking engagement with each other, the planet carrier (46, 48) of said transmission being fixedly connected for joint rotation (FIGS. 16, 17).

14. In a hub as set forth in claim 5, the planet carrier (46) of the first transmission constituting the input member thereof, the sun gear (57) of said first transmission being axially movable on said shaft toward and away from a position of locking engagement with the shaft, said speed control means including means (62) for axially moving said sun gear and for simultaneously locking said planet carrier (46) and said ring gear (47) of said first transmission to each other, the ring gear of said first transmission being fixedly connected to the planet carrier (48) of said second transmission for joint rotation (FIGS. 18, 19).

15. In a hub as set forth in claim 5, the ring gear (47) of said first transmission constituting the input member thereof, the sun gear (57) of said first transmission being axially movable on said shaft between respective positions of locking engagement with the shaft and with the planet carrier (46) of said first transmission, the speed control means including means for moving said sun gear between said positions thereof, the planet gears (46, 48) of said transmissions being connected for joint rotation (FIGS. 20, 21).

16. In a hub as set forth in claim 5, the planet carrier (46) of said first transmission constituting the input member thereof, the sun gear (57) of said first transmission being axially movable on said shaft between respective positions of locking engagement with the shaft and with the ring gear (47) of said first transmission, the speed control means including means for moving said sun gear between said positions thereof, the ring gear (47) of said first transmission being connected to the planet gear (48) of the second transmission for joint rotation (FIGS. 22, 23).

17. In a hub as set forth in claim 5, the ring gear (47) of said first transmission constituting the input member thereof, the sun gear (57) of said first transmission being axially movable on said shaft between respective positions of locking engagement with the shaft and with the ring gear (47) of said first transmission, the planet carriers (46, 48) of said transmissions being connected for joint rotation, the unidirectional clutch of said first transmission being mounted on one of the connected planet carriers (24, 25).

18. In a hub as set forth in claim 5, the planet carrier (46) of said first transmission constituting said input member thereof, the sun gear (57) of said first transmission being axially movable on said shaft between respective positions of locking engagement with the shaft and with the planet carrier (46) of said first transmission, the ring gear (47) of said first transmission being connected with the planet carrier (48) of the second transmission for forming therewith a pair of jointly rotating members, the unidirectional clutch of said first transmission being mounted on one of the members of said pair (FIGS. 26, 27).

19. In a hub as set forth in claim 1, wherein said second actuating means include a carrier member (52'), gear means (57') drivingly connecting said carrier member to said hub shell member for rotation of the carrier member about an axis when the hub shell rotates, and means (53', 54') securing said second actuating member (51') to said carrier member while permitting movement of the second actuating member in a radial direction relative to the axis of rotation of the carrier member.

20. In a hub as set forth in claim 1, said source normally rotating said driving member about said axis in one direction, and said second actuating means responding to rotation of the driving member in the opposite direction by said source for movement of said second actuating member, said second actuating means further comprising means (38–43) for limiting said rotation in said opposite direction.

21. In a multiple-speed hub for a bicycle and like vehicle having:
(a) a stationary shaft (1) having an axis;
(b) a hub shell member (2) rotatable about said axis and receiving a portion of said shaft;
(c) a source of torque including a driving member (4a) rotatable about said axis;
(d) transmission means in said shell for transmitting the torque of said source to said shell at any one of a plurality of transmission ratios,
 (1) said transmission means including two planetary gear transmissions arranged in tandem,
 (2) each transmission including a plurality of members respectively a sun gear (7, 24), a ring gear (11, 27) and a planet carrier (10, 26); a planet gear (9, 25) mounted on said planet carrier in simultaneous meshing engagement with said sun gear and said ring gear, and coupling means (22, 23; 32, 35) for drivingly coupling one of said members of the transmission to said hub shell member;
(e) a control system operatively connected to each of said transmissions for selecting said transmission ratios; and
(f) an actuating system for actuating said control system; the improvement in the actuating system comprising:
(g) first actuating means operatively connected to said hub shell member and including a first actuating member, said first actuating means being responsive to the rotary speed of said hub shell member for movement of said actuating member,
 (1) said control system including first motion transmitting means (50') interposed between said actuating member and one of said transmissions; and
(h) second actuating means operatively connected to said driving member and including a second actuating member (34), said second actuating means being responsive to the direction of rotation of said driving member for movement of said second actuating member,
 (1) said control system including second motion transmitting means (36, 37) interposed between said second actuating member and the other transmission.

References Cited

UNITED STATES PATENTS 3,143,005  8/1964  Schwerdhofer.
3,369,429  2/1968  Kimpflinger et al.

FOREIGN PATENTS 1,147,860  4/1963  Germany.

CARLTON R. CROYLE, *Primary Examiner.*

A. D. HERMANN, *Assistant Examiner.*

U.S. Cl. X.R.

74—752, 781

U.S. DEPARTMENT OF COMMERCE

PATENT OFFICE

Washington, D.C. 20231

UNITED STATES PATENT OFFICE
CERTIFICATE OF CORRECTION

Patent No. 3,438,283

April 15, 196

Hans Joachim Schwerdhofer

It is certified that error appears in the above identified patent and that said Letters Patent are hereby corrected as shown below:

In the heading to the printed specification, lines 5 and 6, "General Dynamics Corporation (Pomona Division), Pomona, Calif., a corporation of Delaware" should read -- Fichtel & Sachs A.G., Schweinfurt, Germany --.

Signed and sealed this 14th day of April 1970.

(SEAL)
Attest:

Edward M. Fletcher, Jr.
Attesting Officer

WILLIAM E. SCHUYLER, JR
Commissioner of Patents